(No Model.)
W. MANLEY.
ROTARY CUTTER FOR TRIMMING BOOT AND SHOE HEELS.
No. 374,418. Patented Dec. 6, 1887.
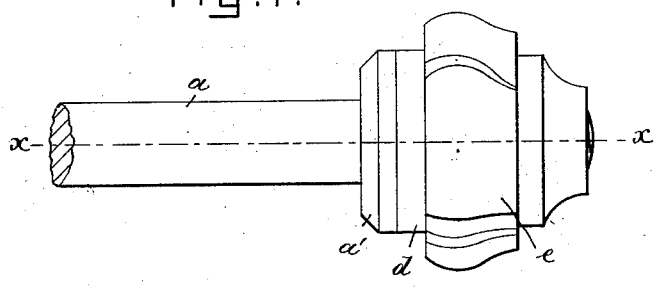
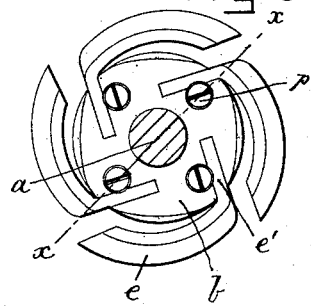
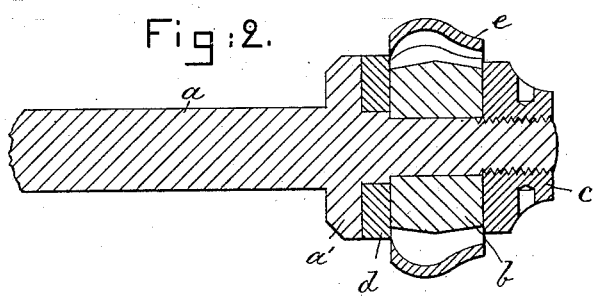
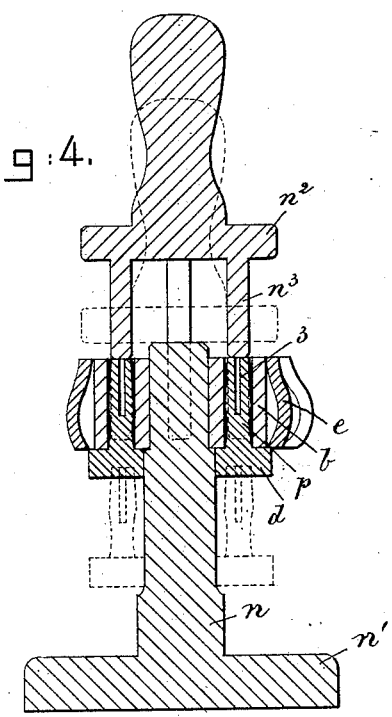
Witnesses.
Fred L. Emery
John F. C. Preinkert
Inventor.
William Manley
by Crosby & Gregory attys

UNITED STATES PATENT OFFICE.

WILLIAM MANLEY, OF ROCHESTER, NEW YORK, ASSIGNOR TO JAMES W. BROOKS, TRUSTEE, OF CAMBRIDGE, MASSACHUSETTS.

ROTARY CUTTER FOR TRIMMING BOOT AND SHOE HEELS.

SPECIFICATION forming part of Letters Patent No. 374,418, dated December 6, 1887.

Application filed November 5, 1886. Serial No. 218,093. (No model.)

*To all whom it may concern:*

Be it known that I, WILLIAM MANLEY, of Rochester, county of Monroe, State of New York, have invented an Improvement in Rotary Cutters for Trimming Boot and Shoe Heels, of which the following description, in connection with the accompanying drawings, is a specification, like letters on the drawings representing like parts.

This invention has for its object to provide a rotary cutter especially adapted for trimming the heels of boots and shoes; and it consists of a main rotating spindle or shaft having a hub secured thereon, combined with a series of cutters of peculiar construction, to be hereinafter described, detachably fastened to the hub by suitable fasteners; also, of a spindle and hub carried by it and a series of cutters detachably connected with the hub, combined with means, substantially as will be described, for removing or detaching all the cutters from the hub at substantially the same time.

The cutters are herein shown as formed of a piece of metal bent at substantially right angles to present a blade and shank, the shank being directly opposite the cutting-edge of the blade. The hub is provided with secant slots in which the shanks of the cutters are placed, and a suitable pin is inserted to key or spline the cutters to the hub. Tools are also provided for removing all the pins from the hub simultaneously, to thereby detach all the cutters at one operation.

Figure 1 shows in side elevation a rotary cutter embodying this invention; Fig. 2, a longitudinal section of the cutter shown in Fig. 1, taken on the dotted line $x$ $x$; Fig. 3, a right-hand end view of the cutter shown in Fig. 1, the check-nut being removed. Fig. 4 shows the hub detached from the spindle or shaft and placed upon a standard, and also suitable tools for removing all the cutters from the hub; and Fig. 5, one of the cutters detached.

The main shaft or spindle $a$, having a flange, $a'$, is of suitable size and length to be applied to heel-trimming machines of any well-known construction.

The spindle $a$ has a hub, $b$, secured in position upon it by a nut, $c$, screwed upon the threaded end of the spindle.

The hub $b$ has detachably secured to it a series of cutters, each cutter consisting of a piece of metal bent at substantially or nearly a right angle to present a blade, $e$, and a shank, $e'$, the cutting-edge of the blade being at one side of the piece of metal and the shank $e'$ at the opposite end.

The hub $b$ is provided with several secant slots to receive the shanks $e'$ of the cutters, although it is obvious that the said slots need not be secants if radial or other slots are deemed better.

Each shank $e'$ is provided with a groove, as shown at 2, Fig. 5, and the hub $b$ is provided with holes located at one side of the secant slots, which holes open into said slots, so that pins $p$ through the holes may enter the grooves 2 and hold the latter in position, as by a key or spline. These pins $p$ are attached to a single ring or collar, $d$, abutting against the flange $a'$ upon the spindle; but they may be independent of each other. Each pin $p$ is also preferably slitted, as at 3, Fig. 4, to enable it to yield and exert friction.

The cutters shaped as described and secured concentrically to the hub $b$ are especially adapted for trimming the heels of boots and shoes, but may be employed for other purposes.

To detach the cutters from the hub in order to grind the same or for other purposes, the hub $b$ is first removed from the spindle $a$ and placed upon a standard or upright, $n$, rising from a suitable base, $n'$, after which a hand-tool consisting of a disk, $n^2$, having a gang or series of pins, $n^3$, corresponding in number and position with the pins $p$ in the hub, is placed above the hub, as shown in Fig. 4, so that the pins $n^3$ will rest against the pins $p$, and then the hand-tool is struck to force all the pins $p$ from the hub at one operation, permitting the cutters to drop or be readily removed from the hub.

The device for removing all the pins, and thereby the cutters, at one operation may, if desired, be omitted and the several pins removed independent of each other without departing from this invention.

I claim—

1. In a rotary cutter for trimming the heels of boots and shoes, and the like, the spindle and hub carried by it, and a series of cutters constructed substantially as described and detachably secured concentrically to the hub, combined with a device, substantially as described, for removing or detaching all the cutters at one operation.

2. In a rotary cutter for trimming the heels of boots and shoes, a spindle and slotted hub carried by it, and a series of cutters, each of which is formed of a piece of metal bent at substantially a right angle, as shown, to present the blade $e$ and the shank $e'$, the said shank $e'$ entering one of the slots in the hub, combined with pins $p$, for securing the cutters to the hub, substantially as described.

3. In a rotary cutter for trimming heels of boots and shoes, a spindle and hub carried by it having secant slots, and a series of cutters, each of which is formed of a piece of metal bent at substantially a right angle to present a blade, $e$, and a shank, $e'$, the said shank $e'$ entering one of the secant slots in the hub, combined with pins $p$, for securing the cutters to the hub, substantially as described.

4. In a rotary cutter for trimming the heels of boots and shoes, the slotted hub and series of cutters secured concentrically to it, and a series of pins or fasteners, $p$, attached to a ring or single piece of material for securing the cutters to the hub, combined with a hand-tool having a series of pins or studs corresponding in number and position with the pins or fasteners $p$, for removing all the said pins or fasteners $p$ at one operation.

In testimony whereof I have signed my name to this specification in the presence of two subscribing witnesses.

WILLIAM MANLEY.

Witnesses:
BERNICE J. NOYES,
B. DEWAR.